United States Patent
Bascom et al.

(12)

(10) Patent No.: US 6,848,159 B2
(45) Date of Patent: Feb. 1, 2005

(54) ROLL RETAINER AND FIBER CHOPPER

(75) Inventors: Randall C. Bascom, Wauseon, OH (US); Jeffrey James Bryant, Maumee, OH (US); Gary Lee Dachenhaus, Liberty Center, OH (US); Archie Mead, Delta, OH (US); Mark J. Scott, Maumee, OH (US); Randy C. Hyter, Toledo, OH (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 10/388,106

(22) Filed: Mar. 13, 2003

(65) Prior Publication Data

US 2003/0173436 A1 Sep. 18, 2003

Related U.S. Application Data

(62) Division of application No. 09/777,449, filed on Feb. 6, 2001, now Pat. No. 6,708,912.

(51) Int. Cl.[7] ............................................... B23P 19/10
(52) U.S. Cl. ...................................... 29/402.08; 29/464
(58) Field of Search ...................... 241/294, 30; 29/464, 29/402.08, 402.01, 402.03

(56) References Cited

U.S. PATENT DOCUMENTS

| 5,553,367 A | * | 9/1996 | Mahoney | ................. 29/402.08 |
| 5,970,837 A | * | 10/1999 | Arterburn et al. | ............. 83/552 |
| 6,315,799 B1 | * | 11/2001 | Toniolo | ....................... 451/65 |

* cited by examiner

*Primary Examiner*—Irene Cuda Rosenbaum
(74) *Attorney, Agent, or Firm*—Robert D. Touslee

(57) ABSTRACT

A chopper for chopping continuous items like fiber, fiber strand, yarn, string, wire, tape or ribbon, etc. which enters the chopper in unwound form at a high linear speed is disclosed having improvements and permit the chopper to tilt to change the angle of discharge of the chopped items(s). Also disclosed is a fast acting roll retainer and a chopper having the fast acting roll retainer that permits a backup roll and a blade roll to be removed and replaced in a faster and lesser damaging manner. Methods of chopping and changing rolls on an apparatus using the disclosed apparatus are also disclosed.

9 Claims, 8 Drawing Sheets

ROLL RETAINER AND FIBER CHOPPER

This application is a division of application Ser. No. 09/777,449, filed Feb. 6, 2001 now U.S. Pat. No. 6,708,912.

BACKGROUND

The present invention involves an improved chopper for chopping continuous or very long fiber, fiber strands, yarn, string, wire, ribbon, tape and the like comprising a backup roll and a blade roll. More specifically, the present invention involves a chopper having a novel quick release knock off-knock on roll retainer for the rolls that must be frequently changed, and means for tilting the chopper to change the angle of discharge of the chopped strand, etc.

It has long been known how to chop continuous fibers or fiber strands into short lengths of about 3 inches or shorter. More than a billion pounds of such products including chopped glass fibers and fiber strands are produced each year in processes and chopping apparatus like those disclosed in U.S. Pat. Nos. 5,970,837; 4,398,934; 3,508,461; and 3,869,268. The choppers disclosed in these patents comprise a blade roll containing a plurality of spaced-apart blades for separating the fibers into short lengths, a backup roll, frequently driven, which the blades work against to effect the separation and which pulls the fibers or fiber strands, often using an idler roll to hold the fibers or fiber strands down onto the surface of the backup roll. In the chopped fiber processes disclosed in these patents, the chopper is usually the most productivity limiting equipment in the processes that typically operate continuously every day of the year, 24 hours each day. Therefore, improvements in the chopper that allow the chopper to pull and chop faster, allow longer times between maintenance shutdowns, and/or to pull and chop more fibers or fiber strands at a time have an extremely positive impact on productivity and production costs.

Due to wear, the blade roll and backup roll on each chopper must be changed frequently with the actual life between changes depending upon the type of item being chopped. The life typically ranges between 4 and 24 hours or more, but a defect in a blade or the elastomer layer on the backup roll can cause even shorter life. Due to their tightness on their spindles and the tacky chemical sizing from the fiber that gets on all exposed parts, it has been necessary to strike the old blade rolls and old backup rolls with a hammer or a heavy bar to loosen them from their spindles before they could be removed for replacement with new rolls. This hammering damages the rolls and in time knocks them out of alignment causing vibration and premature replacement. These are expensive problems for the industry considering that there are hundreds of fiber choppers in operation.

Another problem with fiber choppers when chopping wet fiber having a tacky chemical sizing on the surface of the fibers is that the stream of fibers will, depending on factors such as moisture content and the degree of tackiness of the sizing, leave the chopper at different angles. This presents a problem in catching the fiber with a conveyor belt due to the limited space in the fiber forming rooms where the fiber is formed and chopped and results in some fiber being thrown off the conveyor and onto the floor causing scrap and a housekeeping problem. This problem is discussed in U.S. Pat. No. 4,161,897 and the problem is addressed in that patent by designing the chopper such that the position of the blade roll can be changed to contact the backup roll in different locations. While this may change the angle of discharge of the chopped fiber, it greatly complicates the design and is a costly solution. A simpler, less costly solution has been needed.

SUMMARY OF THE INVENTION

The present invention includes an improved chopper that comprises a backup roll and a blade roll, each roll being mounted on a spindle with a novel fast acting knock off/ knock on roll retainer for holding the blade roll and/or the backup roll in place and for pulling the roll(s) loose from its spindle. This roll retainer assembly comprises a spinner attached to a stub shaft at or near one end, the stub shaft having engaging means that will engage with the spindle for the roll, a locking cup surrounding the stub shaft and free to rotate around the stub shaft, the locking cup having a depression therein with an opening facing away from the spinner, a lock-ring or collar surrounding the stub shaft and residing in the depression in the locking cup, the lock-ring being fixed to the stub shaft. The roll retainer also comprises a locking plate attached to the open end of the lock cup, the locking plate having two or more slots therein for allowing heads of shoulder bolts that ate fastened to the blade roll and/or backup roll at locations spaced from the axis of the roll to pass into or through the slots in a wide portion of the slots. At least one end portion of each slot is narrower than the heads are wide such that the heads cannot pass through the narrower end portion(s) of the slots.

Preferably the assembly also includes a thrust washer or a lubricated washer around the stub shaft and between the spinner and the lock cup to enhance the tightening and loosening of the spinner. Preferably the roll retainer also comprises a lubricated thrust washer in the bottom of the depression in the lock cup to enhance relative movement under stress between the locking ring and the lock cup. Also, preferably the roll has two or more shoulder bolts circumferentially spaced around the opening, most preferably equidistant from each other and from the axis of the roll. This chopper can also comprise means on or attached to the chopper for lifting one side of the chopper to tilt the chopper to change an angle of discharge of an array of chopped product discharging from the chopper.

The present invention also includes a fast acting roll or wheel retainer comprising:

a) a cylindrical stub shaft having one end portion threaded, b) a locking ring having a spaced a part parallel surface perpendicular to and surrounding the stub shaft and being either integral with the stub shaft or being rigidly attached to the stub shaft, c) a spinner having one or more handles, the spinner being located at or near an end of the stub shaft opposite the end that is threaded, the spinner being either integral with the stub shaft or rigidly attached to the stub shaft, d) a lock cup having a bottom and an open top, the bottom of the locking cup having a hole therein and surrounding the stub shaft in a ratable manner at a location between the two ends of the stub shaft, the open top of the locking cup being closest to the threaded end of the stub shaft, and e) a locking plate attached to the open end of the lock cup, the locking plate having a hole therethrough for the stub shaft to reside in a rotatable manner, the locking plate having one or more slot openings at least partially therethrough and spaced from the hole for the stub shaft, each slot opening having a wide portion and a narrower portion, one face of the locking plate being compatible with an engaging face on the roll or wheel and the area on an opposite face around the narrower portion of each slot being compatible to engage a bottom surface of an enlarged head of one or more projections extending from an outboard surface of said roll.

The present invention also includes a method of removing a used roll and replacing it with a new or repaired roll, each roll having an opening around its axis and at least two shoulder bolts with enlarged heads spaced from its axis and protruding from a face of the roll, on a chopper, or other apparatus, having a spindle with threads on a working end using a novel knock on/knock off roll retainer assembly that comprises a spinner attached to a stub shaft at or near one end, the stub shaft having engaging means that will engage with the spindle, a lock cup surrounding the stub shaft and free to rotate around the stub shaft, the lock cup having a depression therein with an opening facing away from the spinner, a lock ring or collar surrounding the stub shaft and residing in the depression in the lock cup, the lock ring being fixed to the stub shaft and a locking plate attached to the open end of the lock cup, the locking plate having one or more slots therein for allowing heads of projections fastened to the blade roll and/or backup roll at locations spaced from the axis of the roll to pass through a wide, central portion of each slot, at least one end portion of each slot being narrower than the heads are wide such that the heads cannot pass into or through the narrower end portion(s) of the slots, comprising the steps of:

a) rotating the spinner in a direction to back the stub shaft off a spindle having a threaded portion such that an outer face of the locking plate which is in contact with the enlarged heads of the shoulder bolts will pull the used roll loose from the spindle without damaging the roll, b) rotating the locking plate such that the wide portion of the slots align with the enlarged heads of the shoulder bolts, c) rotating the spinner to back the stub shaft off of the spindle while preventing the locking plate from rotating and removing the roll, d) placing a new or repaired roll onto the spindle such that a portion of the spindle is in the opening of the roll and such that the two or more projections are facing away from the chopper or other apparatus, e) threading the threaded stub shaft of the roll retainer assembly onto the spindle, f) aligning the slots in the locking plate so that the wide portion of the slots align with the enlarged heads of the shoulder bolts on the roll, g) rotating the spinner to move the stub shaft further onto the spindle while maintaining the alignment of the slots as described in (f) above until the lock plate is against a hub of the roll and the roll is snugly in place on the spindle, and then backing off the stub shaft by rotating the spinner in the opposite direction about 5 to about 180 degrees, h) rotating the locking plate until the end of the slots at the narrower end portion engage the shoulder bolts, and i) rotating the spinner to move the stub shaft onto the spindle the amount backed off in step (g) and then knocking the spinner or a projection on the spinner to tighten the roll on the spindle.

The present invention also includes a chopper for separating long fiber, fiber strands, string, wire, tape or ribbon into short pieces and discharging the short pieces in a direction away from the chopper, the chopper comprising a blade roll, a backup roll and a frame, the improvement comprising means for varying the elevation of one end of the frame of the chopper for the purpose of changing the angle of discharge of the short pieces from the chopper or for maintaining the angle of discharge the same when a different item is fed into the chopper, i.e. an item which has a different tendency to adhere to the elastomer layer on the backup roll. The means for varying the elevation is preferably a jack screw, but can be any known compact means of lifting including a gas cushion lifting device, a fluid cylinder lifting device, a mechanical lever type lifting device similar to a bumper jack with lock, a chain hoist or winch mounted above the chopper frame, and other equivalent lifting devices or shimming means.

Preferably, the lower side of the chopper opposite the lifting means is pivotly mounted to a foot or feet that is/are bolted to the floor or otherwise equipped so that the feet won't slide along the floor when the opposite end is raised by the lifting means. The chopper can be any chopper having a backup roll and a blade roll including the improved chopper using the novel roll retainer described above.

The present invention also includes a chopper for chopping items selected from the group consisting of fibers, fiber strand, yarn, string, wire, and ribbon, tape that enter the chopper in an unwound form at a high linear speed into an array of short lengths, the chopper having an upstream side and a downstream side and a blade roll and a backup roll, the improvement comprising: a second framework or an inner frame or member on which the chopper is mounted, the second framework or inner frame or member being pivotly supported near one side of the chopper by a first framework or an outer frame surrounding at least a part of the second framework or inner frame or member, and lifting means attached to an opposite side of the chopper, said opposite side of the chopper being opposite the side that is near where said inner frame is pivotly supported.

The present invention also includes a method of separating long lengths of items such as fiber, fiber strands, string, wire, tape or ribbon into short pieces by passing the items continuously into a nip between a rotating blade roll and a rotating backup roll of a chopper whereby the item is separated into short pieces which are discharged from the chopper in an array having a direction, the improvement comprising changing the elevation of one end of the chopper with respect to an opposite end of the chopper to change the direction of the array of short pieces.

When the word "about" is used herein, it is meant that the amount or condition it modifies can vary some beyond that so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventor's disclosure and understanding the inventive concept and embodiments disclosed, including the best mode known to the inventor, the inventor and others can, without inventive effort, explore beyond the limits disclosed to determine if the invention is realized beyond those limits and, when embodiments are found to be without unexpected characteristics, those embodiments are within the meaning of the term "about" as used herein. It is not difficult for the skilled artisan or others to determine whether such an embodiment is either as might be expected or, because of either a break in the continuity of results or one or more features that are significantly better than reported by the inventor, is surprising and thus an unobvious teaching leading to a further advance in the art.

DETAILED DESCRIPTION OF THE INVENTION

Figure 1:
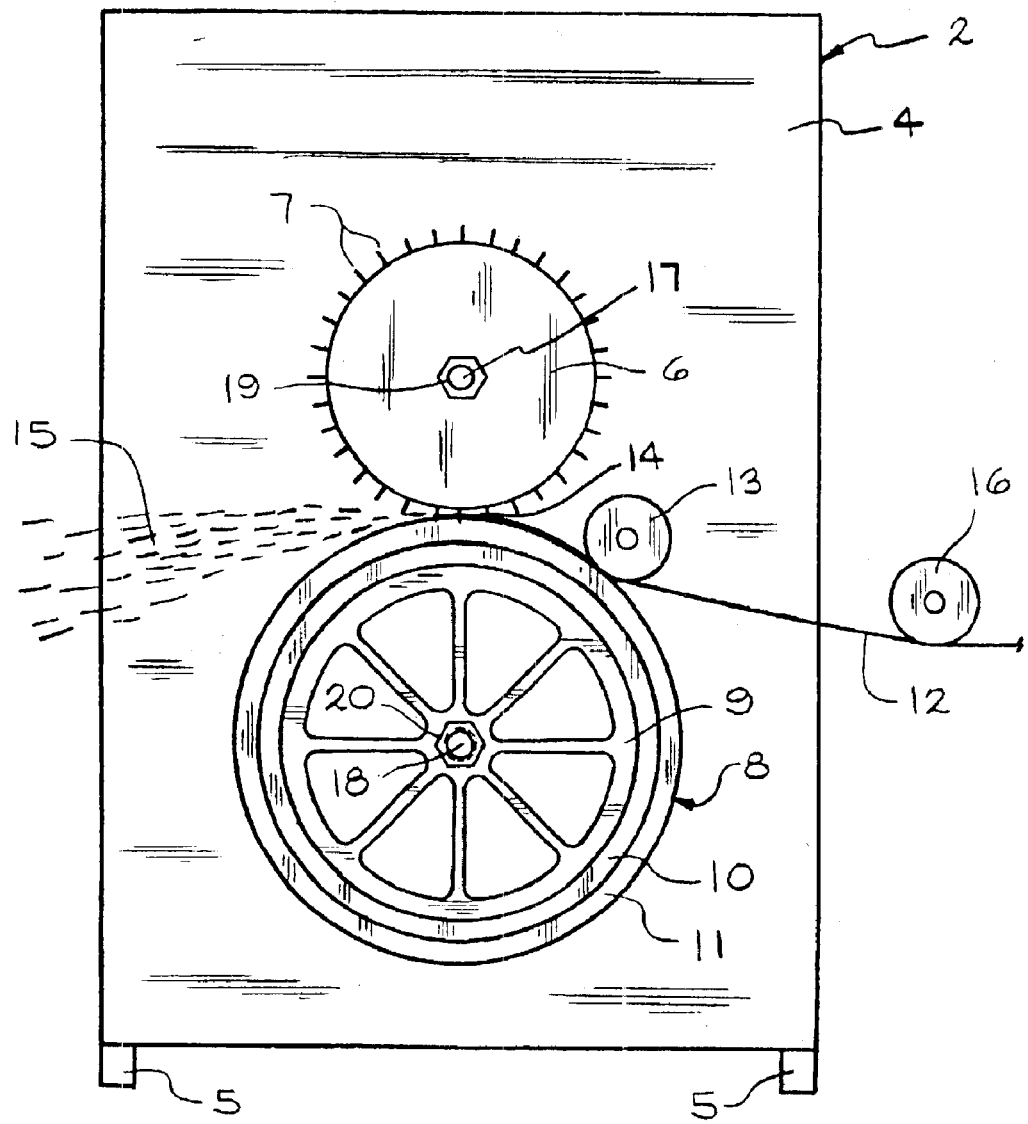
FIG. 1 is a front view of a typical prior art chopper.

FIG. 1 shows a typical prior art chopper 2 comprising a front plate 4 attached to a structural frame (not shown) with a foot 5 at each corner, a blade roll 6 having spaced blades 7 protruding from its periphery. A backup roll 8 comprised of a hub 9, preferably with cutouts and spokes, a rim 10 and an elastomer layer 11 on the rim 10 for the blades 7 to work against. The hub 9 can be continuous or solid with no cutouts or open spaces since the cutouts or open spaces are for the purpose of reducing the weight of either roll.

The continuous or long item(s) 12, for example fiber strands, to be chopped or separated are held against the elastomer layer 11 of the backup roll 8 with an idler roll 13 which permits the rotating backup roll 8 to pull the item(s) 12 into the chopper 2 and on into the nip 14 between the blade roll 6 and the elastomer layer 11, usually at high linear speeds, 1000 or more feet per minute off-line and 2000 or more ft./min. on-line, which chops or separates the item(s) 12 into short lengths 15, such as chopped fiber strands. When the chopper 2 is working on loose items 12 like fibers, fiber strands, yarn, string or wire, the individual strands, etc. are typically separated from each other and guided onto the elastomer layer 11 with a separator or guide roll 16. The blade roll 6 and the backup roll 8 are mounted on spindles 17, 18 respectively and are held tight onto these spindles with large nuts 19, 20 respectively. Choppers of this type are well known and are more fully described in U.S. Pat. Nos. 5,970,837; 4,398,934; 3,508,461; and 3,869,268, the disclosures of which are incorporated herein by reference.

Figure 2:
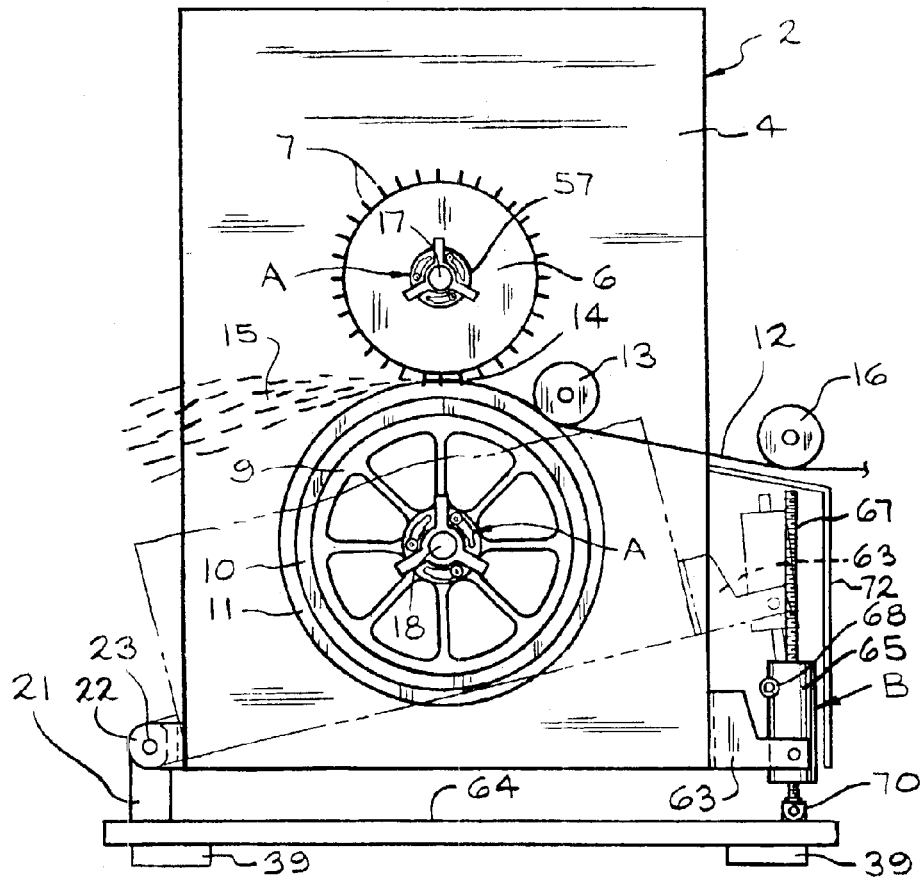
FIG. 2 is a front view of a chopper according to the present invention and also shows in phantom the chopper in a tilted position according to the present invention.

FIG. 2 shows chopper 2 modified according to the present invention having a novel, fast acting knock on/knock off roll retainer assembly A holding the blade roll 6 and the backup roll 8 onto their respective spindles 17 and 18, and preferably also comprising a chopper tilting assembly B. The roll retention assembly A can be used on either one of the blade roll 6 or the backup roll 8, and preferably is used on both. Preferably one lower end of the chopper opposite the tilting assembly B is mounted in a pivoting manner on one or preferably two legs 21 on a floor mount or plate 64, preferably with brackets 22 attached to a bottom side of the chopper and connected to the legs 21 with pins 23 to allow the chopper 2 to be tilted by the tilting assembly B which will be described in detail later. Preferably, the floor mount 64 has four feet 39 to allow prongs of a conventional walking lift truck to move under the floor mount 64 to lift and move the chopper 2.

Figure 3:
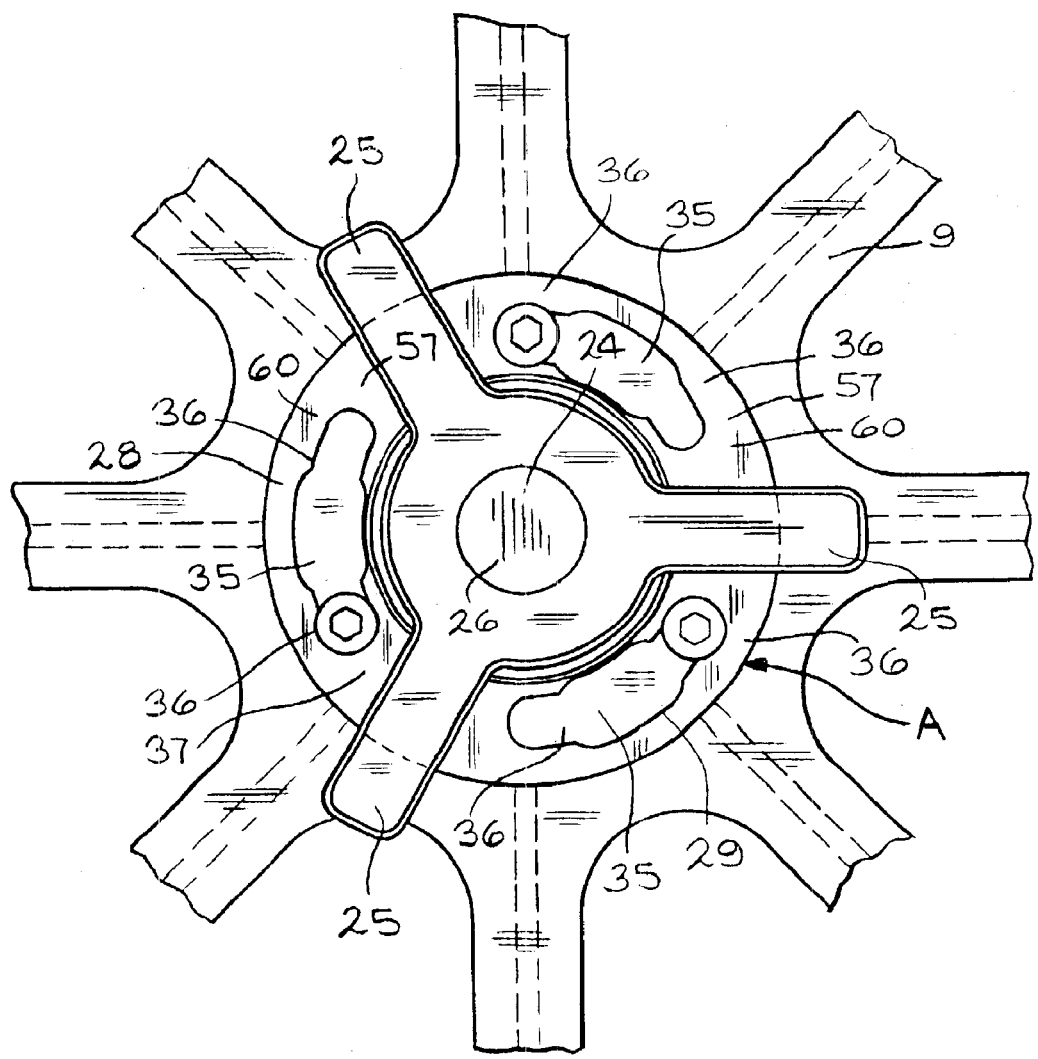
FIG. 3 is a partial expanded front view of a backup roll having a knock on/knock off roll retainer shown in FIG. 2.
Figure 4:
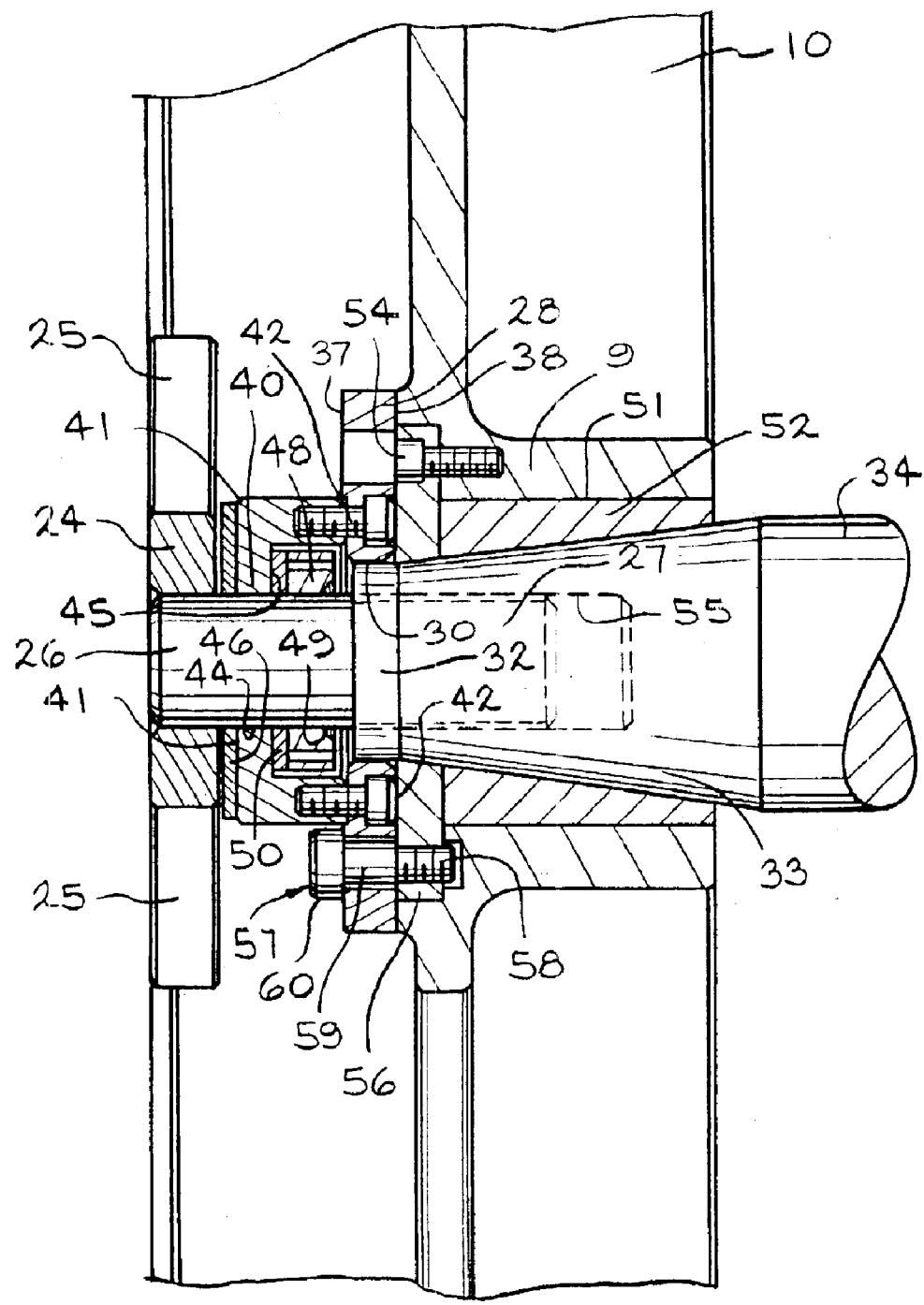
FIG. 4 is a partial expanded side view of a backup roll, spindle, and the knock on/knock off retainer shown in FIGS. 2 and 3.

The roll retainer assembly A is shown in detail in FIGS. 3 and 4 and is comprised of a spinner 24, preferably having at least one handle 25 and most preferably two or three handles 25. The spinner 24 is integral with or rigidly attached at or near one end of a stub shaft 26 which is threaded on an end portion 27, preferably on the outside of the end portion 27 of the stub shaft 26, however in an alternative embodiment the stub shaft 26 could be a pipe and could be threaded on the inside of the pipe. In the latter embodiment, the stub shaft 26 would fit over a threaded end of a spindle.

The roll retainer A also comprises a locking plate 28 having at least one, and preferably three, slots 29 therein that extend at least partially and preferably completely through the thickness of the locking plate 28 and also having a circular hole 30 of a diameter sufficient to slip around the stub shaft 26 and preferably also an end 32 of the spindle 34 for either the backup roll 8 or the blade roll 6. Since the roll retainer A is usable on both the blade roll 6 and the blade roll 8, the term roll or roll 6,8 will be used hereafter to mean either roll.

A centerline of each slot 29 is preferably an arc, being a radius of the axis of the stub shaft 26. Each slot 29 is also spaced from an outer periphery of the hole 30 and has a wide portion 35 and at least one narrower end portion 36. Preferably, each slot 29 has a narrower end portion 36 on each end of the wide portion 35, as shown in FIG. 3.

Preferably the locking plate 28 is circular with the spinner 24 rigidly attached to and centered on the stub shaft 26, the latter protruding through the hole 30 in the locking plate 28 such that the spinner 24 is spaced from an outboard face 37 of the locking plate 28 and the end portion 27 of the stub shaft 26 being spaced from an inboard face 38 of the locking plate 28. The outboard face 37 of the locking plate 28 should be parallel to the inboard face 38 of the locking plate 28, at least in an area adjacent to the narrow end portion(s) 36 of the slots 29.

The locking plate 28 is bolted to a locking cup 40 that surrounds the stub shaft 26 between the spinner 24 and the locking plate 28, preferably with a plurality of socket head cap screws 42, the heads of which are recessed in the inboard face 38 of the locking plate 28. The locking cup 40 has a circular hole 44 having a diameter slightly larger than the diameter of the stub shaft 26 and completely through its bottom surface 41 so that the locking cup 40 can rotate around the stub shaft 26. The locking cup 40 is oriented on the stub shaft 26 such that its bottom 41 is close to the spinner 24 and its top surface butts against the outboard face 37 of the locking plate 28.

Optionally, but preferably, a thrust washer or pre-lubricated washer 46 surrounds the stub shaft 26 in a loose and rotatable manner between the spinner 24 and an exterior bottom surface 43 of the locking cup 40 to allow the spinner 24 and the stub shaft 26 to more easily rotate, while under stress and while the exterior bottom of the cup 40 remains stationary. A suitable washer for this purpose is an oil impregnated bronze thrust type washer. Other thrust washers can be used so long as they don't deform excessively under the load to cause binding to the bottom exterior surface 41 of the locking cup 40. Any type of thrust washer can be used. Lubrication of the washer 46 helps to prevent fiber sizing from drying and sticking to the washer surfaces.

A lock ring (collar) 48 surrounds the stub shaft 26 and is rigidly attached such as by being welded to the stub shaft 26 as with welds 49. The lock ring 48 can be rigidly attached to the stub shaft 26 in any suitable manner, such as welding, or could even be an integral part of the stub shaft 26, but this case the spinner 24 is not integral with the stub shaft 26. The lock ring 48 is attached to the stub shaft 26 such that it is contained in and surrounded on its periphery by the locking cup 40 with a face of the lock ring 48 closest to, but spaced from, an interior bottom surface 45 of the locking cup 40 and an opposite face closest to the locking plate 28. Optionally, but preferably, a lubricated thrust washer 50 surrounds the stub shaft 26 and resides in the space between the interior bottom surface 45 of the lock cup 40 and the face of the lock ring 48 closest to the interior bottom surface 45 of the locking cup 40. The thrust washer 50 is preferably the same type washer as the thrust washer 46. The purpose of the thrust washers 46 and 50 will be described later in the description of the knock on/knock off roll retainer A.

The roll spokes and hub 9 for use with the preferred roll retainer A illustrated here has a hole 51 centered around its axis and oversized for the spindle so that the hole 51 can receive an insert 52. The insert 52 is securely attached, preferably by a pressed fit or strong adhesive, to the hub 9 of the roll 8. It is further held in place with recessed bolts 54, or an equivalent, passing through a flange 56 adjacent the insert 52 and into the hub 9. The outer diameter of the flange 56 is larger than that of the insert 52 whose outer diameter is preferably just slightly greater than the diameter of the hole 51 in the hub 9. The insert 52 and flange 56 could be an integral part of the hub 9.

The insert 52, including the flange 56, has a hole through it centered around its axis. The diameter of the hole is preferably smallest, as installed on the chopper 2 and spindle 34, on an outboard side and tapers to a larger diameter on the inboard side to fit a preferred reverse taper on an outboard end of the spindle 34. This taper insures a tight fit of the insert 52 onto the spindle 34, but also is what has made it necessary to strike the backside of the roll or pry the backup and blade rolls off their spindles. This is not necessary with the knock on/knock off roll retainer of the present invention.

The spindle 34 need not be tapered on the portion that engages the hub 9 of the rolls 6,8 or the insert 52, but can be of uniform diameter and can also have ridges or grooves to engage grooves or ridges in the insert 52 to insure against slippage. In any case, rolls 6,8 have been difficult to get loose from the spindle when it is desired to remove the rolls 6,8 after they have been in operation chopping for at least a few hours. The spindle 34 including the outboard end portion 32 has a threaded opening 55 centered around its axis on its outboard end to accept the threaded stub shaft 26 in a threaded relationship. Preferably, the outer periphery of the outboard end portion 32 of the spindle 34 is surrounded by the flange 56 and or the locking plate 28 as it resides in the opening of the locking plate 28 and/or at least a portion of the flange 56 when the roll 6, 8 and its insert 52 is in place in the hub 9 on the spindle 34.

Threaded into the flange 56 of the insert 52 from the outboard side are at least one and preferably two, three or more spaced apart shoulder bolts 57 having a threaded portion 58, an unthreaded portion 59 having a diameter of slightly less than the width of the end portion 36 of the slots 29 in the locking plate 28 of the roll retainer A, and a head 60 having a diameter larger than the width of the end portion 36 of the slots 29, but smaller than the width of the wide portion 35 of the slots 29. The length of the unthreaded portion 59 of the shoulder bolts 57 should be slightly greater than the thickness of the locking plate 28. To save time in changing the backup roll 8 and the blade roll 6, it is preferred that all such rolls be equipped with the insert 52 and the shoulder bolts 57 secured tightly into the flange 56, and into the hub 9 if desired, but of course, neither of these preferences or modifications are necessary to practice the present invention. Also, preferably, but not necessarily, all of the secured shoulder bolts 57 are spaced apart, preferably equally spaced apart, around a single radius of the axis of the opening 30 in the locking plate 28, but obviously different arrangements will also work so long as the slots 29 in the locking plate 28 align with the shoulder bolts 57 when the stub shaft 26 is threaded into the opening 55 of the spindle 34.

All parts of the roll retainer A, except for the thrust washers 46 and 50, are preferably made from a strong material such as a stainless steel that will not corrode in the hot, wet environment. Many other materials can also be used such as other metals, alloys and fiber reinforced plastics.

To use the fast acting roll retainer A of the present invention, a new roll such as a backup roll 8 containing the insert 52 therein and having preferably three shoulder bolts 57 secured in the flange 56 is placed on the spindle 34, preferably in a snug manner. The threaded end of the stub shaft 26 of the roll retainer A is then threaded into the threaded opening 55 of the spindle 34 at least several turns by turning or spinning the spinner 24 and handles 25. Next, the locking plate 28 is rotated with one hand, preferably while holding the handles 25 with the other hand to prevent the stub shaft 26 from rotating, to align the wide portion 35 of the slots 29 with the heads 60 of the shoulder bolts 57, and the stub shaft 26 is rotated into the opening 55 of the spindle 34 until at least hand tight using the handles 25. Then, the spinner 24 is backed off about 5–180 degrees and the locking plate 28 is rotated to seat the end portion 36 of the slots 29 against the unthreaded portion 59 of the shoulder bolts 57. Last, the spinner 24 is rotated to tighten the inboard face 38 of the locking plate 28 against the outboard face of the hub 9 and/or the flange 56 on the insert 52, and finally, tightened by striking one of the handles 25 with a dead blow, such as by striking it with a lead-headed hammer or a hammer containing heavy pellets in the head portion. In the final tightening step the lubricated washer 46 enhances the relative movement of an inboard face of the spinner 24 to move while the exterior bottom surface 43 of the locking cup 40 remains fixed, i.e. does not rotate. The roll 6,8 is now in place and ready to operate.

When it is time to remove the roll 6 or 8 from the chopper 2, one of the handles 25 is struck one or more dead blows to start backing the stub shaft 26 out of the hole 55 in the spindle 34. As that happens the outboard face of the lock ring 48 pushes against the second lubricated thrust washer 50 which pushes against the interior bottom surface 45 of the locking cup 40. Note that the lock ring 48 is fixed to, or integral with, the stub shaft 26. The thrust washer 50 enhances the relative movement of the outboard face of the rotating lock ring 48 and the non-rotating interior bottom surface 45 of the locking cup 40 under stress. As the lock cup 40 is pushed in an outboard direction by the action of backing the stub shaft 26 out of the hole 55, the insert 52 and the roll 6,8 is pulled loose from the spindle 34 by the outboard face 37 pushing against the heads 60 of the shoulder bolts 57. Once the insert 52 has been broken loose on the spindle 34, the spinner 24 is rotated in the other direction a few degrees by hand to loosen the locking plate 28 with respect to the heads 60 of the shoulder bolts 57. While holding the spinner 24 from rotating, the locking plate 28 is rotated to move the heads 60 into the wide portion 35 of the slots 29 and then the spinner 24 is spun with the handles 25 to remove the stub shaft 26 from the opening 55 in the spindle 34 and the roll retainer A is removed. The roll 6,8 is now ready to be removed and replaced with a new or repaired roll 6,8.

Using the roll retainer A of the present invention, a roll 6,8 on a chopper can be changed faster than was the experience with the roll retainer means of the prior art. Large wrenches or compressed air impact tools are not required. Instead only a dead blow hammer or device such as a lead hammer is needed and this makes the job go faster and easier. Also, since it is not necessary to strike the rolls to loosen them from the spindle when it is time to remove a roll, the rolls last longer. With each roll change, the roll retainer of the present invention saves at least about 30 seconds and typically more than that. With two rolls to be changed at each chopper rebuild the time savings are at least one minute. When this savings is cumulated over the period of a year with the typical number of choppers used and the typical blade life, the extra production gained is at least 100–186 hours and at least 1,000,000 pounds of additional product and at least 1,000,000 pounds of reduced scrap produced. This amounts to substantial marginal profit improvement.

When a different sizing is used causing more or less tackiness on the surface of the fiber, the angle at which the chopped fiber array leaves the backup roll 8 changes. This change in angle or direction of discharge with different products causes the fiber to sometimes strike the collecting or transporting device like a conveyor at less than an optimum location and some fiber misses and either falls on the floor or gets under the belt, the latter causing belt tracking problems and scrap which can contaminate the good product. The material falling on the floor creates a costly housekeeping problem and often ends up as scrap. These conditions are costly and undesirable. Also, when the chopped product being produced requires partial or complete drying, it is desirable to feed the product directly into an entrance to the dryer. To accomplish the latter it is necessary to change and adjust the angle of discharge of chopped fiber from the chopper.

Figure 2A:
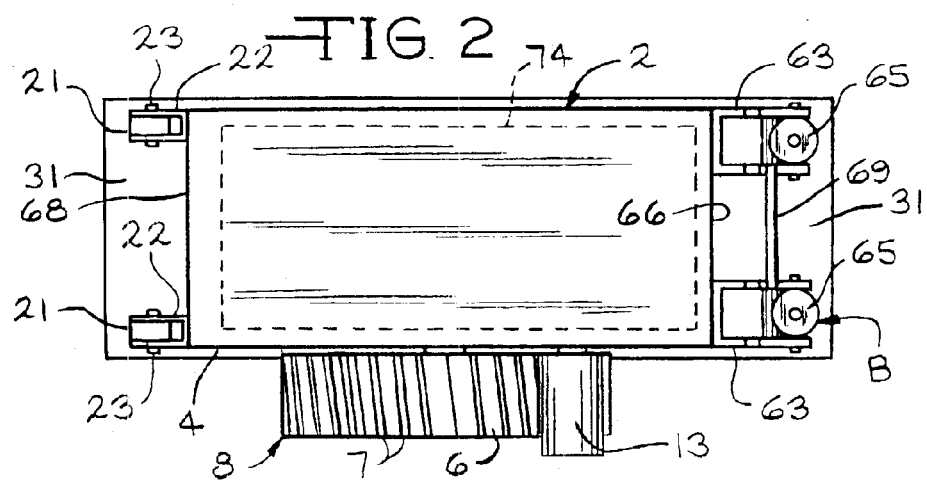
FIG. 2A is a plan view of the chopper shown in FIG. 2.

FIGS. 2 and 2A show a preferred embodiment, B, according to the present invention for precisely changing the angle of discharge. Prior art choppers 2 typically rested on four feet 5 on the floor. In the preferred embodiment of the present invention, the chopper 2 rests instead on one or more brackets 22 pivotly attached to one or more legs 21 at or near one bottom edge of one side of the chopper 2, which legs are attached to a pedestal 64, and brackets 63 connected to a lifting mechanism B that is also supported by the pedestal 64. This arrangement allows the chopper to be tilted. This arrangement is accomplished with at least one, and preferably two, clevis type brackets 22 spaced apart and attached rigidly to a lower portion of one side of the chopper 2. Each bracket 22 is pivotly attached to one leg 21 with the pin 23. The leg or legs 21 are attached to the pedestal 64 in any suitable manner.

On the opposite side of the chopper 2 at least one, and preferably two spaced apart, larger clevis type brackets 63 are rigidly attached to a lower portion of the opposite side of the chopper, preferably at or near the bottom edge. Pivotly attached to each of the brackets 63 is a jack, preferably a screw jack 65. A bottom end of a screw 67 of the screw jack 65 is attached in any known pivoting manner, such as with a pivoting bracket 70 attached to the top surface of the pedestal 64. A semi-spherical depression in the top surface of pedastal with a ball on the bottom end of screw 67 would also be suitable. The pedestal 64 can be solid or can be a frame having an open center portion 74 as shown.

Preferably two screw jacks 65 are used and the two are tied together with a drive shaft 69 which is turned with a ratchet tool or hand crank (not shown) at a socket receiver 68. This allows both screw jacks 65 to be adjusted to the same degree at the same time. A protective guard 72 is removably attached to the upstream end 66 of the chopper 2 to protect the screw jacks 65 and the screws 67 from fiber and sizing that would otherwise fall on the these items and interfere with their smooth operation.

In this embodiment the screw jacks 65 are on an upstream side 66 of the chopper 2 and the legs 21 are on the discharge side 68 of the chopper 2, but the screw jacks 65 could be mounted on the discharge side 68 of the chopper 2 with the legs 21 and brackets 22 being mounted on the upstream side 66 of the chopper 2 when that configuration is needed to provide the desired result, or the same desired result in a more desirable manner.

FIG. 2 shows in phantom the chopper 2 tilted by lifting the upstream side 66 with the screw jacks 65 to cause the angle of discharge of chopped item 15 to be lowered in a direction closer to the pedestal 64. Also, the chopper 2 can be operated normally in the position shown in phantom. Then the angle of discharge of the chopped items 15 can be raised in a direction away from the pedestal 64 by lowering the upstream side 66 of the chopper 2, using the screw jacks 65, until the angle of discharge of the chopped item 15 is acceptable.

Figure 5:
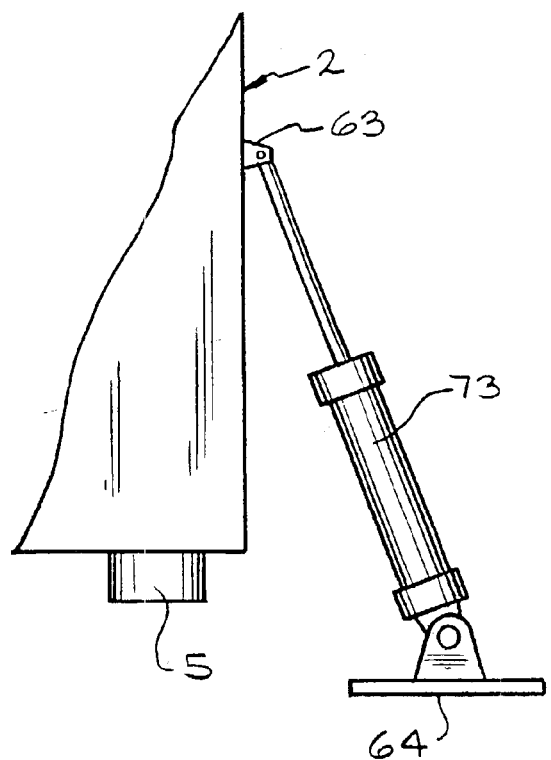
FIG. 5 is a partial front view of another embodiment of the invention related for tilting the chopper.
Figure 6:
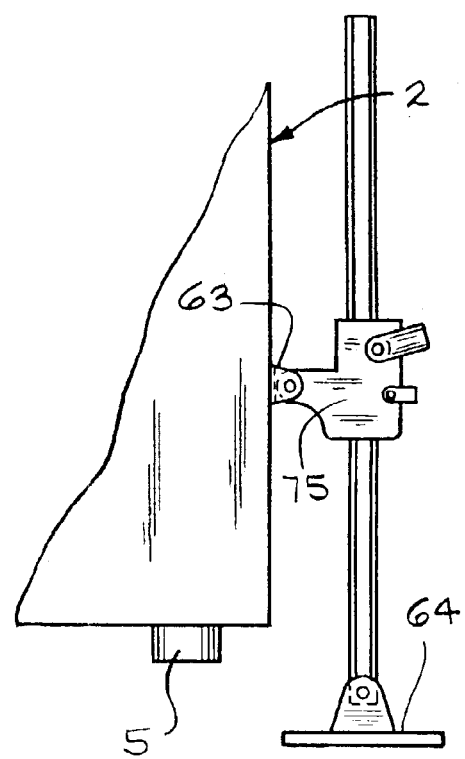
FIG. 6 is a partial front view of still another embodiment of the invention for tilting the chopper.

As shown in FIGS. 5 and 6, lifting devices other than the screw jack 65 can be used in accordance with the present invention such as a fluid cylinder 73 powered by either a gas like air or a hydraulic fluid, or a simple mechanical jack like an automotive bumper jack 75. Other types of lifting devices can also be used such as one or more overhead winches, chain-falls, fluid cylinders, etc. and off floor lifting devices such as one or more scissor jacks, inflatable bags, etc.

Figure 7:
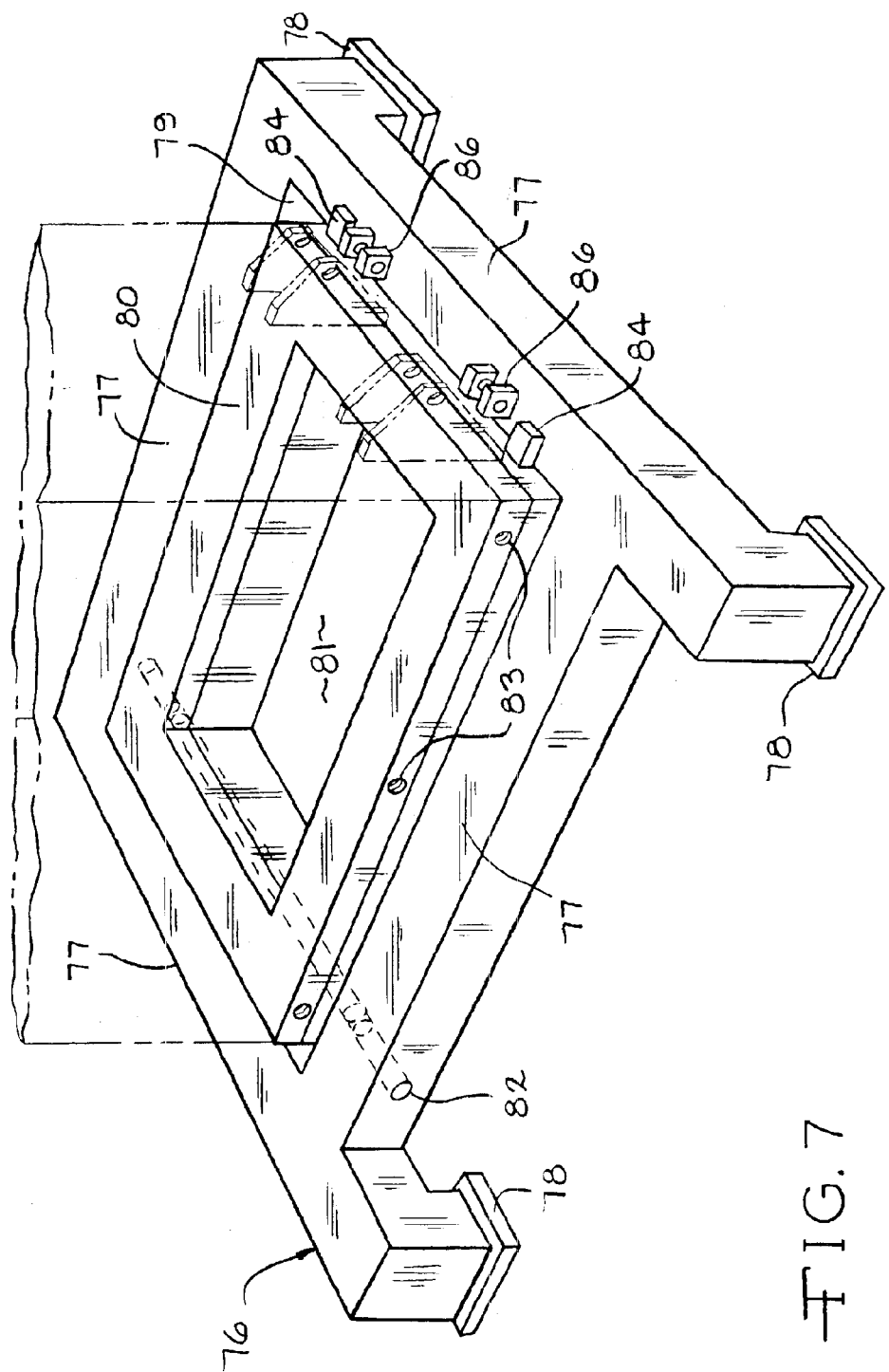
FIG. 7 is a perspective view of a preferred chopper base for tilting the chopper showing in phantom a portion of the chopper mounted on the base.
Figure 8:
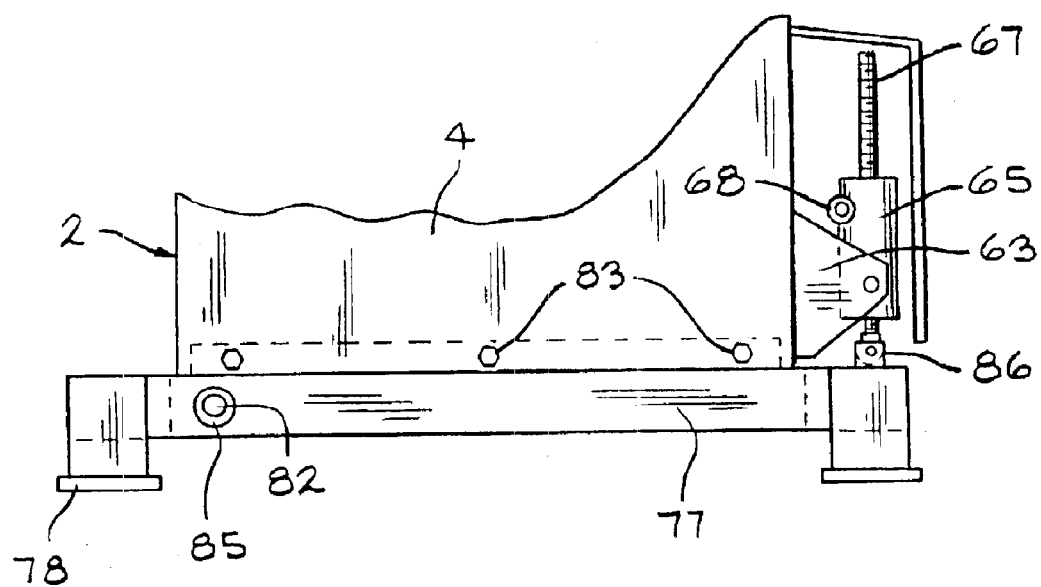
FIG. 8 is a front view of the preferred base shown in FIG. 7 which also shows part of the chopper mounted thereon.

FIGS. 7 and 8 show a preferred frame 76 for mounting the chopper 2 upon to tilt the chopper according to the present invention. The frame 76 contains a square or rectangular framework 77 having a square or rectangular opening 79 therein in which is pivotly mounted a second framework 80 on an axle 82 that passes through the framework 77 and into or through the second framework 80 near one end of the second framework 80. The framework 77 and the second framework 80 could be other shapes including other polyagonal shapes, U shaped, a circle or oval. Also, the second framework can be just two separate members with one end of each member attached to an axle 82 and the member attached to the bottom of the chopper frame or one member attached to the the chopper front plate and the other member attached to a chopper back plate.

Optional stops 84 can be attached on an opposite end of the second framework 80 to contact the top of the framework 77 when the top of the second framework 80 is level. Brackets 86 are attached in any suitable manner, preferably to the top of the framework 77, in the embodiment shown in FIG. 7 near where the stops 84 contact the framework 77 for connecting the bottom ends of the screw 67 of the screw jacks 65 (See FIG. 8). The brackets could also obviously be placed on the bottom or one of the sides of the framework 77.

The chopper 2 is preferably attached to the movable framework, 80 in the embodiment shown in FIGS. 7 and 8, in any suitable manner which will secure the chopper in a stable and safe manner. In the embodiment shown in FIGS. 7 and 8, threaded holes 83 are placed in at least two sides of the second framework 80 for attaching the bottom edges of the chopper 2 to the second framework 80. The chopper need not be bolted to the frame but that is preferred. The chopper could simply sit on the second framework 80 and in such an embodiment, the chopper would be more secure if the top of the second framework 80 had depressions in its top surface for chopper feet 5 such as shown in FIG. 1. The frame 76 also has legs 78 attached to the framework 77 for setting on the forming room floor and for spacing the bottom of the framework 77 from the floor so that a lift truck can get under the frame 76 and chopper 2 to lift and move the frame 76 and chopper 2.

While the embodiment shown in FIGS. 7 and 8 show the chopper attached to the second framework 80 and legs 78 attached to the first or outer framework 77, it is also workable to reverse this arrangement by placing the legs on the second framework 80 and attaching the chopper 2 to the first or outer framework 77. In this latter configuration the brackets 63 would be located inside the chopper cabinet formed by the front plate 4, the side plates 66 and 68 and a back plate, and the lifting devices 65 would also be inside the chopper 2 cabinet and would rest on the top face of the second framework 80.

Figure 9:
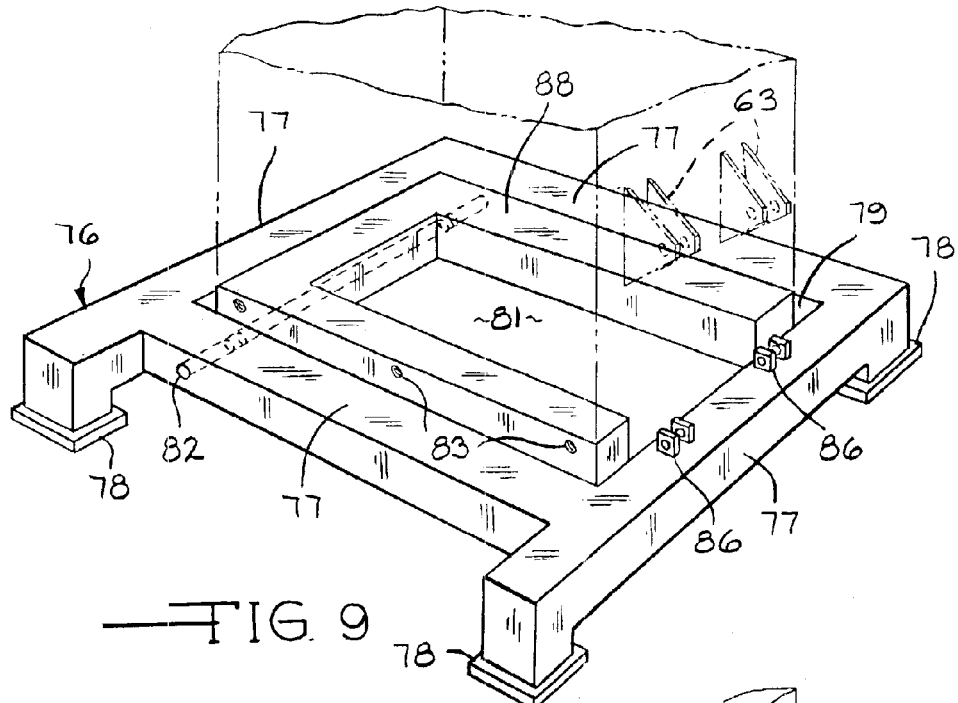
FIG. 9 is a perspective view of a still further embodiment which is a modification of the embodiment shown in FIG. 7.

FIG. 9 shows in perspective an embodiment that is a modification of the embodiment shown in FIG. 7. In this embodiment, the second framework 80 has been modified to make a U-shaped framework 88 to support the chopper 2. Since the two legs of the U-shaped framework 88 are bolted to the front or back plate of the chopper 2 using threaded holes 83 in each of the legs of the U-shaped framework 88 as shown, this arrangement works well. It is also possible to flip the U-shaped framework so that the open end of the U is at the end of the frame 77 opposite the end supporting the screw jacks 65. In this latter case the axle 82 passes through, or into, an end portion of each leg of the U-shaped framework 88.

Using the embodiment shown in FIG. 9, and omitting the optional stops 84 (FIG. 7) and placing the brackets 63 higher on the chopper, the angle of discharge can be raised or lowered with the same embodiment since the free end of the second framework 80 nearest the screw jacks 65 can be both raised and/or lowered as the second framework 80 can be lowered through the opening 79 to below the first framework 77.

Figure 10:
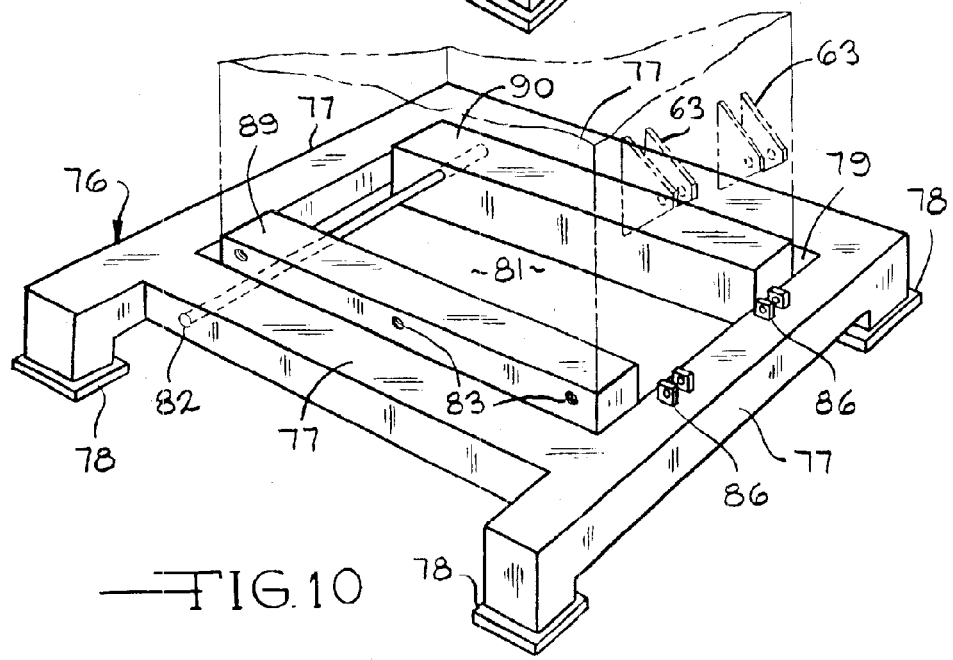
FIG. 10 is a perspective view of a still further embodiment which is another modification of the embodiment shown in FIG. 7.

FIG. 10 shows in perspective a still further embodiment which is another modification of the embodiment shown in FIG. 7. In this embodiment, the inner frame 80 is replaced with a first chopper support member 89 and a second chopper member 90. Each of the chopper support members 89, 90 are pivotly mounted or supported by the axle 82 passing into or through each of the chopper support members 89, 90 near one end. Each of the chopper support members 89, 90 contain threaded holes 83 for attachment to the front plate 4 and a back plate (not shown) of the chopper 2.

The preferred embodiments of the invention and other embodiments of the invention are disclosed above with the broader concept of the invention. It will be obvious to the artisan in the appropriate art that modifications other than those disclosed above can be made to achieve the same results in substantially the same manner within the concept of the invention, and it is intended that these modifications are encompassed in the following in which

We claim:

1. A method of removing a pulley, roll or wheel and replacing it with a different or repaired pulley, roll or wheel on an apparatus having a spindle with threads on a working end, each pulley, roll or wheel having an opening around its axis and at least one projection with an enlarged head spaced from its axis and protruding from a face of the pulley, roll, or wheel using a pulley, roll or wheel retainer assembly that comprises a spinner attached to a stub shaft at or near one end of the stub shaft, the stub shaft having engaging means that will engage with the spindle, a lock cup surrounding the stub shaft and free to rotate around the stub shaft, the lock cup having a depression therein with an opening facing away from the spinner, a lock ring surrounding the stub shaft and residing in the depression in the lock cup, the lock ring being fixed to the stub shaft and a locking plate attached to an open end of the lock cup, the locking plate having one or more slots therein for allowing the enlarged head of each projection fastened to the pulley, roll or wheel at one or more locations spaced from the axis of the roll to pass through a wide portion of each slot, at least one end portion of each slot being narrower than the enlarged head is wide such that the head cannot pass into or through the at least one narrower end portions of the slot, comprising the steps of:

a) rotating the spinner in a direction to back the stub shaft off of the spindle having a threaded portion thereon such that an outer face of the locking plate which is in contact with the enlarged head of each projection will pull the used pulley, roll or wheel loose from the spindle without damaging the pulley, roll or wheel, b) rotating the locking plate such that the wide portion of each slot aligns with the enlarged head of each projection, c) rotating the spinner to back the stub shaft off of the spindle while preventing the locking plate from rotating and then removing the retainer and pulley, roll or wheel, d) placing a new or repaired pulley, roll or wheel onto the spindle such that a portion of the spindle is in the opening of the pulley, roll or wheel and such that each projection is facing away from the apparatus, e) aligning each slot in the locking plate so that the wide portion of each slot aligns with the enlarged head of each projection on the pulley, roll or wheel, f) threading the threaded portion of the stub shaft of the pulley, roll or wheel retainer assembly onto the spindle, g) rotating the spinner to move the stub shaft further onto the spindle while maintaining the alignment of the slots as described in (f) above until the locking plate is against a part of the pulley, roll or wheel, h) rotating the locking plate until the end of each slot at the narrower end portion engages one projection, backing the spinner off the spindle about 2–180 degrees if necessary to allow the locking plate to rotate by hand, i) rotating the spinner to move the stub shaft onto the spindle the amount backed off in step (h) and to seat the pulley, roll or wheel onto the spindle and finally knocking the spinner to tighten the pulley, roll or wheel on the spindle.

2. The method of claim 1 wherein the roll retainer also comprises a thrust washer in the lock cup surrounding the stub shaft in a rotatable manner between an interior bottom of the lock cup and the lock ring.

3. The method of claim 1 wherein the locking plate contains more than one slot whose axis is a radius of the axis of the stub shaft and that are equally spaced from each other and from the axis of the stub shaft.

4. A method of separating long lengths of items selected from the group consisting of fiber, fiber strands, yarn, string, wire, tape or ribbon into short pieces by passing the items in an unwound condition at a high linear speed continuously into a nip between a rotating blade roll and a rotating backup roll of a chopper whereby the item is separated into short pieces which are discharged from the chopper in an array having an angle of discharge, removing a used roll on the chopper and replacing it with a new or repaired roll, the improvement comprising that each roll having an opening around its axis and at least one projection with an enlarged head spaced from its axis and protruding from a face of the roll, on the chopper having a spindle with threads on a working end, using a roll retainer assembly that comprises a spinner attached to a stub shaft at or near one end, the stub shaft having engaging means that will engage with the spindle, a lock cup surrounding the stub shaft and free to rotate around the stub shaft, the lock cup having a depression therein with an opening facing away from the spinner, a lock ring surrounding the stub shaft and residing in the depression in the lock cup, the lock ring being fixed to the stub shaft and a locking plate attached to the open end of the lock cup, the locking plate having one or more slots therein for allowing heads of the projections fastened to the roll to pass into or through a wide, central portion of each slot, at least one end portion of each slot being narrower than the head is wide such that the head cannot pass into or through the narrower end portion(s) of the slots, comprising the steps of:

a) rotating the spinner in a direction to back the stub shaft off of a spindle having a threaded portion thereon such that an outer face of the locking plate, which is in contact with the enlarged head(s) of the projection(s), will pull the used roll loose from the spindle without damaging the roll,
   b) rotating the locking plate such that the wide portion of each slot aligns with the enlarged head of each projection,
   c) rotating the spinner to back the stub shaft off of the spindle while preventing t locking plate from rotating, and removing the roll retainer and the roll,
   d) placing a new or repaired roll onto the spindle such that a portion of the spindle is in the opening of the roll and such that the one or more projections are facing away from the chopper or other apparatus,
   e) threading the threaded stub shaft of the roll retainer assembly onto the spindle,
   f) aligning each slot in the locking plate so that the wide portion of each slot aligns with the enlarged head of one projection on the roll,
   g) rotating the spinner to move the stub shaft further onto the spindle while maintaining the alignment of the slots as described in (f) above until the lock plate is against a hub of the roll,
   h) rotating the locking plate until the end of each slot at the narrower end portion engages one projection, backing off the stub shaft if necessary by rotating the spinner in the opposite direction from about 5 to about 180 degrees, to allow the locking plate to be rotated,
   i) rotating the spinner to move the stub shaft onto the spindle the amount backed off in step (h) and to seat the roll and then knocking the spinner or spinner handle to tighten the roll on the spindle, and changing the elevation of one end of the chopper with respect to an opposite end of the chopper to change the angle of discharge of the array of short pieces.

5. The method of claim 4 wherein the roll retainer also comprises a thrust washer in the lock cup surrounding the stub shaft in a rotatable manner between an interior bottom of the lock cup and the lock ring.

6. The method of claim 4 wherein the locking plate contains more than one slot whose axis is a radius of the axis of the stub shaft and that are equally spaced from each other and from an axis of the stub shaft.

7. A method of removing a used roll on a chopper for chopping items selected from the group consisting of fiber, fiber strand, yarn, string, wire, ribbon and tape and replacing with a new or repaired roll, each roll having an opening around its axis and at least one projection with an enlarged head spaced from its axis and protruding from a face of the roll, on a chopper or other apparatus having a spindle with threads on a working end using a roll retainer assembly that comprises a spinner attached to a stub shaft at or near one end, the stub shaft having engaging means that will engage with the spindle, a lock cap surrounding the stud shaft and free to rotate around the stud shaft, the lock cap having a depression therein with an opening facing away from the spinner, a lock ring surrounding the stub shaft and residing in the depression in the lock cup, the lock ring being fixed to the stud shaft and a locking plate attached to the open end of the lock cup, the locking plate having one or more slots therein for allowing an enlarged head of each projection fastened to the roll at a location spaced from the axis of the roll to pass through a wide portion of each slot, at least one end portion of each slot being narrower than the head is wide such that the head cannot pass into or through the at least one narrower end portion of each slot, comprising the steps of:

a) rotating the spinner in a direction to back the stub shaft off of a spindle having a threaded portion thereon such that an outer face of the locking plate which is in contact with the enlarged head of each projection will pull the used roll loose from the spindle without damaging the roll,
   b) rotating the locking plate such that the wide portion of each slot aligns with the enlarged head of one projection,
   c) rotating the spinner to back the stub shaft off of the spindle while preventing the locking plate from rotating and removing the roll retainer and roll,
   d) placing a new or repaired roll onto the spindle such that a portion of the spindle is in the opening of the roll and such that the one or more projections are facing away from the chopper or other apparatus,
   e) threading the threaded stub shaft of the roll retainer assembly onto the spindle,
   f) aligning each slot in the locking plate so that the wide portion of each slot aligns with the enlarged head of one projection on the roll,
   g) rotating the spinner to move the stub shaft further onto the spindle while maintaining the alignment of each slot as described in (f) above until the locking plate is against the hub of the roll,
   h) rotating the locking plate until the narrower end portion of each slot engages one projection, if necessary backing off the stub shaft by rotating the spinner in the opposite direction from about 5 to about 180 degrees to allow the locking plate to be-rotated by hand, i) rotating the spinner to move the stud shaft onto the spindle the amount backed off in step (h) and to seat the roll and then knocking the spinner or spinner handle to tighten the roll on the spindle.

8. The method of claim 7 wherein the roll retainer also comprises a thrust washer in the lock cup surrounding the stub shaft in a rotatable manner between an interior bottom of the lock cup and the lock ring.

9. The method of claim 7 wherein the locking plate contains more than one slot whose axis is a radius of the axis of the stub shaft and that are equally spaced from each other and from an axis of the stub shaft.

* * * * *